Patented Jan. 27, 1942

2,271,378

UNITED STATES PATENT OFFICE 2,271,378

PEST CONTROL

Norman Edward Searle, McDaniel Heights, Del., assignor to E. I. du Pont de Nemours & Company, Wilmington, Del., a corporation of Delaware No Drawing. Application February 19, 1940, Serial No. 319,791. In Germany August 30, 1939

19 Claims. (Cl. 167—22)

This invention relates to pest control compositions useful as bactericides, fungicides, insecticides, and disinfectants, and has for its general object the provision of new and useful compositions having the power of killing or repelling economically or physiologically harmful pests, such as bacteria, fungi, insects, and the like which prey on plant and animal matter either in its animate, inanimate, or fabricated state.

According to this invention the improved bactericidal, fungicidal and insecticidal compositions contain as an essential active ingredient a linear polymeric onium salt, and still more particularly a linear polymeric quaternary ammonium salt as defined below. The multiply recurring linear polymeric unit of the latter type of salt comprises a chain of atoms, two of which are pentavalent nitrogen atoms separated by organic radicals whose terminal atoms are carbon. Of the remaining three valences on each intralinear nitrogen, one is satisfied by a radical comprising the anion of an acid, and two are satisfied by organic radicals attached to the nitrogen through carbon. Of the various carbons attached to each intralinear nitrogen, it is preferred that not more than one should be joined to another carbon by a multiple bond.

The great majority of these polymeric salts may be represented as having the following structure:

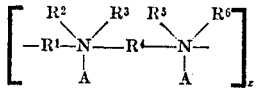

wherein $x$ is an integer representing the number of multiply recurring units in the polymeric chain, A is the anion of an acid, and $R^1$, $R^2$, $R^3$, $R^4$, $R^5$, and $R^6$ are all organic radicals joined to the nitrogen by carbon. In the preferred modification the several R's are so selected in relation to each other that $R^1$ contains a singly-bonded carbon adjacent to the nitrogen and of the remaining radicals no two attached to one nitrogen contain a multiply bonded carbon adjacent to the nitrogen. $R^2$ and $R^3$ can be externally joined to form a ring, as can $R^5$ and $R^6$.

These salts used in the present invention are characterized in general by water solubility, and, depending on their structure, are amorphous powders, resinous masses, viscous liquids, or crystalline-like solids.

These polymeric salts are highly effective bactericides, in many instances being effective in aqueous dilutions of 1:20,000 to 1:50,000 against *Staphylococcus aureus*, i. e., more than 250 times as effective as phenol under the same test conditions. Moreover, it has been discovered that the linear polymeric quaternary ammonium salts have a definite fungicidal effect and a very desirable insecticidal activity as, for example, against moths, Mexican bean beetles, and the like.

The biological properties of the linear polymeric onium salts, such as the linear polymeric quaternary ammonium salts, vary widely with the individual members of the class, many of them being markedly toxic to bacteria and others being only moderately effective. Those which have been found outstanding are the polymeric quaternary ammonium salts prepared from a dibromide in which the bromines are attached to aliphatic hydrogen-bearing carbon atoms, and a ditertiary diamine in which the nitrogens are separated by an aliphatic chain of at least 6 carbon atoms, the remaining valences on the nitrogen being satisfied by short-chain hydrocarbon radicals. Another outstanding type of polymeric quaternary ammonium salt is that derived from a dibromide in which the bromines are attached to aliphatic hydrogen-bearing carbon atoms and a ditertiary diamine in which the radical between the nitrogens contains one or more arylene groups, the remaining valences on the nitrogen being satisfied by short-chain hydrocarbon radicals.

The polymeric salts with which this invention is concerned were tested for bactericidal action according to the standard F. D. A. (Federal Drug Administration) method. Their bacteriostatic activity, i. e., their efficacy for inhibiting bacteria growth, was also determined by methods well known in bacteriology.

The more detailed practice of the invention is illustrated by the following examples, wherein parts given are by weight. There are of course many forms of the invention other than these specific embodiments.

*Example I*

Eight and six-tenths (8.6) parts of N,N,N',N'-tetramethylhexamethylenediamine and 12.20 parts of hexamethylene dibromide are dissolved in 160 parts of methyl alcohol and the resulting solution refluxed for 24 hours. At the end of this time the alcohol is taken off under vacuum, giving a white product in 98% yield. Upon analysis the product shows an ionic bromine content averaging 37.88%. A product of the formula $(C_{16}H_{36}Br_2N_2)_n$ has a calculated bromine content of 38.46%. The accompanying table illustrates the bactericidal activity of the product when tested against *Staphylococcus aureus* at 37° C. in the presence and absence of added serum.

In accordance with common usage in bactericidal testing, the (+) sign in the following table, as well as those in the succeeding examples, indicates growth in the culture while the (−) sign indicates no growth.

| No horse serum | Dilution | | | | Phenol (control) dilution | |
|---|---|---|---|---|---|---|
| Cultures at— | 1:5,000 | 1:10,000 | 1:20,000 | 1:50,000 | 1:80 | 1:90 |
| 5 min | − | − | + | + | + | + |
| 10 min | − | − | + | + | − | + |
| 15 min | − | − | − | + | − | + |

| 10% horse serum added | Dilution | | | |
|---|---|---|---|---|
| Cultures at— | 1:5,000 | 1:10,000 | 1:20,000 | 1:50,000 |
| 5 min | − | − | − | + |
| 10 min | − | − | − | − |
| 15 min | − | − | − | − |

As indicated by a comparison of the above tables, the polymeric quaternary ammonium salt exhibits a very good bactericidal power against *Staphylococcus aureus*, and this activity is definitely enhanced by the addition of horse serum to 10% concentration. Compared to phenol it is between 125 and 250 times as active when tested in the absence of horse serum, and 625 times as active in the presence of horse serum. When tested against *Staphylococcus aureus* in 50% horse serum broth, it was found that the highest effective bacteriostatic dilution is a little higher than its highest effective germicidal or bactericidal dilution.

The above-described polymeric quaternary ammonium salt can also be used advantageously with other germicides, and it has been observed that admixture with mercurial germicides results in an increased bacteria-killing activity. The following table illustrates the killing activity on spores of Hay bacillus by means of a tincture of 4-nitro-anhydro-hydroxymercuri-ortho-cresol, a tincture of the same compound with the above polymeric salt, and a tincture of the polymeric salt alone. The observation was made on the culture after 12 days incubation.

| Cultures | Tincture of 4-nitro-anhydro-hydroxy-mercuri-ortho-cresol | Tincture of 4-nitro-anhydro-hydroxy-mercuri-ortho-cresol plus polymeric salt | Tincture of polymeric salt |
|---|---|---|---|
| Positive | 18 | 0 | 3 |
| Negative | 32 | 50 | 16 |
| Percent negative | 64 | 100 | 32 |

The tincture of the polymeric quaternary ammonium salt alone shows a spore-killing power greater than other nonmercurials.

*Example II*

Decamethylene dibromide (174 parts) and N, N, N', N' - tetramethylhexamethylenediamine (100 parts) are dissolved in 500 parts of methyl alcohol and the solution is refluxed for 19 hours. At the end of this time the solution is filtered and the alcohol removed under diminished pressure. A 98% yield of a resinous, light yellow, polymeric quaternary ammonium salt is obtained.

This product was tested according to the F. D. A. method against *Staphylococcus aureus* at 37° C. both in the absence and presence of serum, and the results are given by the following table.

| With 10% horse serum | Dilution | | | Phenol (control) dilution | |
|---|---|---|---|---|---|
| Cultures at— | 1:2,000 | 1:5,000 | 1:10,000 | 1:80 | 1:90 |
| 5 min | − | + | + | + | + |
| 10 min | − | − | + | + | + |
| 15 min | − | − | − | + | − |

| No serum | Dilution | | |
|---|---|---|---|
| Cultures at— | 1:5,000 | 1:10,000 | 1:20,000 |
| 5 min | − | + | + |
| 10 min | − | − | + |
| 15 min | − | − | + |

Thus, the polymeric quaternary ammonium salt of this example has a good bactericidal potency against *Staphylococcus aureus*, and its effectiveness is not appreciably lowered by 10% horse serum. The activity is 125 times that of phenol.

The above-described polymeric quaternary ammonium salt has a high inhibiting action on the growth of *Staphylococcus aureus* when tested in 50% horse serum broth as indicated by the table given below. The amounts indicated are mixed in 50% serum broth to make 10 cc., seeded with 0.1 cc. of a 1:100,000 dilution of culture. The results were observed after 2 and 7 days respectively, the temperature being 37° C.

| | Cc. of the polymeric quaternary ammonium salt at a dilution of 1:1000 | | | | | | |
|---|---|---|---|---|---|---|---|
| | 2.0 | 1.5 | 1.0 | 0.75 | 0.5 | 0.3 | 0.2 |
| Growth at 2 days | − | − | − | − | − | − | + |
| Growth at 7 days | − | − | − | − | − | − | + |

Similar bacteriostatic tests against *Streptococcus hemolyticus* showed that under the same conditions growth was prevented by a dilution of 1:100,000. Additional tests show that 1:20,000 and 1:10,000 dilutions prevented the growth of *Streptococcus hemolyticus* and pneumococcus Type I in 1.0 cc. defibrinated rabbit blood seeded with 1:100,000 dilution of culture.

*Example III*

Twenty and eighty-four one-hundredths (20.84) parts of decamethylene dibromide and 20.30 parts of 1,10-bis(diethylaminomethoxy)decane are heated for 10 hours at 100° C. The resulting product is dissolved in boiling water, the solution filtered, and the solvent removed under vacuum.

This product, when tested according to the

F. D. A. method, has a moderate bactericidal potency against *Staphylococcus aureus*. The following table illustrates the effective dilutions of this product, in the presence as well as in the absence of horse serum.

| Cultures at— | Activity in 10% horse serum | | | No serum | | Phenol (control) | |
|---|---|---|---|---|---|---|---|
| | 1:1,000 | 1:2,000 | 1:5,000 | 1:2,000 | 1:5,000 | 1:80 | 1:90 |
| 5 min | − | + | + | − | + | + | + |
| 10 min | − | ± | ± | − | ± | ± | ± |
| 15 min | − | − | + | − | − | − | + |

This product shows a bactericidal activity 250 times that of phenol. When tested in 50% horse serum broth against *Staphylococcus aureus*, the above product shows a good bacteriostatic potency, the highest dilution that prevented growth to the seventh day being 1:300,000.

Example IV

A mixture of 13.20 parts of p-xylylene bromide and 8.60 parts of N,N,N',N'-tetramethylhexamethylenediamine in 160 parts of methyl alcohol is heated on a steam bath for one hour. The resulting polymer, which is insoluble in methyl alcohol, is filtered off and dried over phosphorus pentoxide in a vacuum. The yield is 21 parts or 96% of theory. The product has an ionic bromine content averaging 36.06% and a total bromine content of 36.82%, the calculated bromine content being 36.65%.

When tested according to the F. D. A. method, this product has a very good bactericidal activity against *Staphylococcus aureus*, a dilution of 1:20,000 killing in five minutes or less as indicated by the accompanying table.

| Cultures at— | Dilution | | | Phenol (control) dilution | |
|---|---|---|---|---|---|
| | 1:10,000 | 1:20,000 | 1:50,000 | 1:80 | 1:90 |
| 5 min | − | − | + | + | + |
| 10 min | − | − | ± | − | ± |
| 15 min | − | − | + | − | + |

The polymeric quaternary ammonium salts have been found to be very effective against pathogenic molds, such as *Trichophyton*, *Epidermophyton cruris*, and *Microsporon lanosum*, and also against a pathogenic yeast, *Monilia albicans*. The activity of the compounds of this invention toward these pathogenic fungi is shown by the following examples.

Example V

The activity of the polymeric quaternary ammonium salt from N,N,N',N'-tetramethylhexamethylenediamine and hexamethylene dibromide against trichophyton (pathogenic mold) is given in the accompanying table. (Honey broth was used to grow seed cultures and also for subculture after exposure to the polymeric salt.)

| Cultures at— | Dilution | | | Phenol (control) dilution | |
|---|---|---|---|---|---|
| | 1:1,000 | 1:2,000 | 1:5,000 | 1:120 | 1:140 |
| 5 minutes | − | + | + | + | + |
| 10 minutes | − | ± | ± | − | ± |
| 15 minutes | − | − | + | − | + |

Example VI

The activity of the polymeric quaternary ammonium salt from N,N,N',N'-tetramethylhexamethylenediamine and hexamethylene dibromide against *Epidermophyton cruris* (pathogenic mold), honey broth being used, is shown in the following table.

| Cultures at— | Dilution | | | | Phenol (control) dilution | |
|---|---|---|---|---|---|---|
| | 1:2,000 | 1:5,000 | 1:10,000 | 1:20,000 | 1:140 | 1:160 |
| 5 minutes | − | + | + | + | + | + |
| 10 minutes | − | ± | ± | ± | ± | ± |
| 15 minutes | − | − | − | + | − | + |

Example VII

The activity of the polymeric quaternary ammonium salt from N,N,N',N'-tetramethylhexamethylenediamine and hexamethylene dibromide against *Microsporon lanosum* (pathogenic mold) is given in the following table:

| Cultures at— | Dilution | | Phenol (control) Dilution |
|---|---|---|---|
| | 1:2,000 | 1:5,000 | 1:40 |
| 5 min | + | + | − |
| 10 min | − | + | − |
| 15 min | − | + | − |

Example VIII

The activity of the polymeric quaternary ammonium salt from N,N,N',N'-tetramethylhexamethylenediamine and hexamethylene dibromide against *Monilia albicans* (pathogenic yeast) is indicated in the following table:

| Cultures at— | Dilution | | | | Phenol (control) dilution | |
|---|---|---|---|---|---|---|
| | 1:2,000 | 1:5,000 | 1:10,000 | 1:20,000 | 1:100 | 1:120 |
| 5 min | − | + | + | + | + | + |
| 10 min | − | ± | ± | ± | ± | ± |
| 15 min | − | − | − | + | − | + |

The salts with which the present invention is concerned have been found to be useful in controlling and checking the development of common fungi in addition to the pathogenic molds as described in the foregoing examples. This fungicidal activity has been well demonstrated by means of standard tests utilizing the agar plate method. This consists of dispersing the polymeric quaternary ammonium compounds in a nutrient agar favorable to the growth of such fungi as *Aspergillus niger* (common black mold) and *Penicillium sp.* (common blue mold). The liquid agar containing the suspended polymeric quaternary ammonium compound is then poured into sterile Petri plates and when cool inoculated with the spores or pits of mycelium of the above fungi. The effective concentration is then determined from a series of test plates of varying concentration ranges and is represented by that concentration completely inhibiting all growth of the fungus mycelium and spore germination upon examination six days following the inoculation. The effectiveness of the polymeric quaternary ammonium compounds is further shown by the following examples:

Example IX

A polymeric quaternary ammonium salt prepared from N,N,N',N'-tetramethyl-p,p'-diaminodiphenylmethane and decamethylene dibromide is tested in a dilution of 1:1000 with *Aspergillus niger* and *Penicillium sp.* in the above manner. This dilution has been found to be effective in comlpetely inhibiting the growth of these fungi.

Example X

A polymeric quaternary ammonium compound from 1,10-bis(diethylaminomethoxy)-decane and decamethylene dibromide similarly tested in a dilution of 1:1000 against *Aspergillus niger* and *Penicillium sp.* completely inhibits the development of the fungi.

Example XI

Using the same technique given above, a polymeric quaternary ammonium salt from N,N,N',N'-tetramethylethylenediamine and decamethylene dibromide completely inhibits the development of the above-mentioned fungi at a dilution of 1:250.

For fungicidal purposes, the polymeric quaternary ammonium salts can be applied by means of any one of the usual methods, such as, for instance, spraying or dipping. Due to the water solubility and the non-volatility of the polymeric onium salts these compounds are especially suitable for treating wood and other cellulosic materials to prevent staining and rotting by molds. For the same reasons, they may be used as preservatives in wall-board and similar fabricated materials. They are also effective preservatives for glue.

The polymeric onium salts are also very effective disinfectants to rid seeds of bacterial and fungus infections. These salts can also be applied to plant cuttings, seedlings, bulbs, and the like, since they are non-injurious to plant life at bactericidal and fungicidal concentrations.

In addition to the marked bactericidal and fungicidal activity just described, the polymeric onium and particularly the polymeric quaternary ammonium compounds with which the present invention is concerned possess high insecticidal activity, both as contact insecticides for sucking insects and as stomach poisons for leaf-eating insects. For insecticidal purposes, polymeric quaternary ammonium salts may be applied in any one of the usual methods, such as, for instance, by dusting or by spraying solutions or appropriately prepared suspensions thereof in water. They may be used alone or mixed with other insecticidal materials, or with inert materials such as talc and clay, or other diluents which would serve to improve their spreading or adherence. A suitable composition for use against insects is illustrated by the following example, which demonstrates efficacy of this class of compounds as stomach insecticides.

Example XII

A 1% talc dust of the linear polymeric quaternary ammonium salt from N,N'-bis-(beta-hydroxyethyl) piperazine and decamethylene dibromide is prepared by milling appropriately weighed quantities of the polymeric salt with talc. This dust is sprayed on bean foliage exposed to a known number of Mexican bean beetle larvae. By this spraying treatment, 83% of the larvae are destroyed within five days. Using a 5% dust prepared by milling 5 parts of the polymeric quaternary ammonium salt with 20 parts diatomaceous earth and 75 parts talc, this kill is increased to 100%.

Example XIII

A dust is prepared by milling 5 parts of the polymeric quaternary ammonium compound prepared from N,N,N',N'-tetramethylhexamethylenediamine, decamethylene glycol, paraformaldehyde, and hydrogen chloride with 20 parts of diatomaceous earth and 75 parts of talc. When applied to bean foliage exposed to a known number of Mexican bean bettle larvae, the dusting treatment results in an 80% kill of the larvae within five days.

Example XIV

The polymeric quaternary ammonium salt prepared from N,N,N',N'-tetramethyl-p,p'-diaminodiphenylmethane and decamethylene dibromide is used as a water spray in concentration of 0.5% on black chrysanthemum aphids. A 59% kill of the aphids is thus effected within 24 hours, and there is no plant injury.

Example XV

The polymeric quaternary ammonium compound prepared from N,N,N',N'-tetramethylethylenediamine and decamethylene dibromide in a 0.5% aqueous solution is sprayed on black chrysanthemum aphids. Within 24 hours, this treatment results in killing 49% of the aphids.

These linear polymeric quaternary ammonium compounds are easily incorporated into materials to be protected against insect attack by simply immersing the goods in an aqueous solution of the compound. They are especially useful on woolen articles and are thus very desirable as mothproofing agents. The following examples illustrate the mothproofing activity of these compounds.

Example XVI

Pieces of eiderdown fabric are impregnated with a 2% suspension in water of a polymeric quaternary ammonium bromide prepared from N,N'-bis-(beta-hydroxyethyl) piperazine and decamethylene dibromide and then exposed to clothes moth larvae (*Tineola biselliella*). After two weeks, 100% of the larvae are dead, and the damage to the fabric, as estimated by visual observation of the destruction to the nap, amounts to only 1%. A check test with unimpregnated pieces shows 5% kill and damage to the goods amounting to 80%.

Example XVII

Pieces of eiderdown fabric are impregnated with a 2% water solution of the polymeric quaternary ammonium compound prepared from N,N,N',N'-tetramethyl-p,p'-diaminodiphenylmethane and decamethylene dibromide and then exposed to clothes moth larvae. After two weeks, all of the larvae are killed by this treatment.

*Example XVIII*

Pieces of eiderdown fabric are impregnated with a 2% aqueous solution of the polymeric quaternary ammonium compound prepared from N, N, N', N' - tetramethylhexamethylenediamine and decamethylene dibromide and then exposed to clothes moth larvae. Examination of the larvae after two weeks shows that this treatment kills 95% of the larvae.

*Example XIX*

Pieces of eiderdown fabric are impregnated with a 2% suspension in water of the polymeric quaternary ammonium chloride prepared from N, N, N', N' - tetramethylhexamethylenediamine, decamethylene glycol, paraformaldehyde, and hydrogen chloride. After exposing the treated fabric to clothes moth larvae for two weeks, this treatment effects a kill amounting to 85%.

*Example XX*

Pieces of eiderdown fabric are impregnated with a 2% aqueous solution of the polymeric quaternary ammonium salt prepared from N,N,N',N'-tetramethyl-p-phenylenediamine and decamethylene dibromide and then exposed to the clothes moth larvae. After two weeks, a kill of 90% of the clothes moth larvae is effected.

The polymeric onium salts can also be used very satisfactory for protecting such materials as wool, fur, hides, hair, and the like from the ravages of insects. For this purpose, the polymeric quaternary ammonium salts are especially desirable since they do not materially affect the wearing properties and quality of the articles fabricated from wool, fur, hides, hair, etc., nor do they have an adverse effect on dyed materials.

In using the polymeric onium salts for the destruction and the control of one or more types of pests and other organisms that commonly infest plant or animal matter, these products may be dispersed in any suitable medium such as nonsolvent liquids, admixed with suitable carriers such as talc or diatomaceous earth, and dissolved in solvents. When so dispersed, dissolved or admixed, they may be used for dusting, spraying, or application to plant foliage, impregnating fibrous materials, disinfecting materials subject to attack of microorganisms, and in many similar environments where insecticides, fungicides, bactericides, and disinfectants are commonly employed. In many applications, it may be desirable to include suitable spreading and dispersing agents, suitable adhesives, sticking agents and fixatives, and other materials useful in promoting the effectiveness for the particular purpose in mind. Likewise, they may be used in combination with other toxic materials whenever required to obtain maximum effectiveness in the simultaneous control of one or more of several pests. The latter, however, will not as a rule be found necessary, especially with the preferred types of compounds of the general class covered by this invention.

The pesticidal potency of the linear polymeric quaternary ammonium salts may vary with the anion present. Thus by introducing different anions, pesticidal compositions of varying degrees of effectiveness may be obtained containing compounds which have the same polymeric nucleus but different anions.

In the foregoing examples the use as pesticides of certain specific linear polymeric quaternary ammonium salts is described. The invention is in nowise limited to the use of these particular compounds, since any polymeric onium salt can be effectively used. The polymeric onium salts are characterized by the presence of a multiply recurring unit comprising at least seven chain atoms of which two are onium atoms separated by organic radicals attached by carbon to the onium atoms, one valence of each onium atom being satisfied by the anion of an acid, all other valences being satisfied by organic radicals attached through carbon preferably not more than one of which carbons is multiply bonded to carbon. The unit, in multiply recurring, necessarily implies at least six onium atoms in the polymer. The preferred compounds have a much greater number of onium atoms. The polymeric onium type of structure may be present in a variety of other salts. Therefore, in its broader aspects, this invention is understood to include pest control compositions containing as active ingredients one or more linear polymeric onium salts, for example, those of the quaternary ammonium, the ternary sulfonium, and the quaternary phosphonium types.

As already indicated the most important phase of the broader invention comprises the use for bactericidal, fungicidal, insecticidal, and pesticidal purposes, compositions containing as an active ingredient or ingredients one or more of the linear polymeric quaternary ammonium salts. Classed as linear polymeric quaternary ammonium salts are a large variety of compounds which may be prepared by several different methods. For example, these compounds can be prepared by the reaction of ditertiary diamines (i. e., diamines wherein both amino groups are tertiary) with dihalides wherein both halogens have an atomic weight of at least 35 and are bound to singly bonded aliphatic carbons (i. e., to aliphatic carbon atoms joined to other atoms by single bonds only). The ditertiary diamines can be reacted with the dihalides either in equimolecular proportions or in molal ratios of diamine to dihalide from about 0.8 to about 1.2 to form effective pesticides. However, the preferred compounds are prepared from reactants reacted in equimolecular proportions or very nearly so.

The ditertiary diamines mentioned above may be broadly represented by the formula

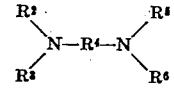

wherein $R^2$, $R^3$, $R^4$, $R^5$, and $R^6$ are all organic radicals joined to nitrogen by carbon and so selected in relation to each other that no two of the radicals attached to one nitrogen are linked to the nitrogen by a carbon which is attached in turn to a second carbon atom by a multiple bond. $R^2$ and $R^3$ may also be externally joined to form a ring as may $R^5$ and $R^6$.

Subject to the requirement just indicated, the divalent radical joining the nitrogen can be aliphatic or aromatic, cyclic or acyclic, homocyclic or heterocyclic, saturated or unsaturated, and can be substituted or not by groups which do not interfere with the polymer-forming reaction, such as ether, sulphide, keto, nitro, amide, hydroxyl, thiol, and the like. The radicals to which only one nitrogen is attached can be of the same character or one or both nitrogens can be attached to a single divalent radical of any of the above-mentioned types, the nitrogen thereby forming a part of a heterocyclic ring. Specific amines which are suitable include the following:

N,N,N',N'-tetramethyltriethyleneglycoldiamine
N,N,N',N'-tetraethyl-1,4-cyclohexylenediamine
N,N'-bis-(2-hydroxyethyl)piperazine
1,10-bis(diethylaminomethoxy)decane
bis-(4-morpholino)dodecane
bis-(1-piperidyl)octane
1,6-bis(dimethylamino)-2,5-dimethylhexane
N,N,N',N'-tetramethyl-p-phenylenediamine
N,N,N',N'-tetraethyl-1,6-diamino-3-hexene
N-allyl-N,N',N'-trimethyloctadecamethylenediamine
triethylenediamine
1,2-bis(dimethylamino)propane
bis-(N,N-dimethylaminomethyl)urea
bis-(N,N-dimethylaminomethyl)thiourea
di(p-dimethylamino)phenyl ether
N,N'-dimethyl-N,N'-diethylhexamethylenediamine
alpha,alpha'-dipyridyl
4-(beta-N-piperidylethyl)quinoline
alpha-(gamma-dimethylaminoethyl)pyridine
4-(beta-N-piperidylethyl)-6-methoxyquinoline
1,4-bis(2-imidazolinyl)butane
1,5-bis(2-oxazolinyl)pentane
1,6-bis(2-thiazolyl)hexane
1,10-bis(2-benzimidazolyl)decane In addition, naturally occurring dietertiary diamines, such as certain alkaloids, are likewise included within the scope of this invention, and specific examples are the following: nicotine, cuscohygrine, cinchonine, cinchonidine, quinine, quinidine, cupreine, hydrocupreine, etc.

In the preparation of the linear polymeric quaternary ammonium salts from dihalides and ditertiary diamines, monofunctional reactants, for example, monohalides or monotertiary amines can be used in limited amounts to control the molecular weight of the polymers by forming end groups on the chain.

Dihalides wherein both halogens have an atomic weight of at least 35 and are attached to singly-bonded aliphatic carbons, i. e., to aliphatic carbon atoms joined to other atoms only by single bonds, can be reacted with the above ditertiary diamines to yield the pesticides of this invention. Many of these dihalides can be represented by the general formula $$\text{Hal}-\overset{\overset{H}{|}}{\underset{\underset{H}{|}}{C}}-R-\overset{\overset{H}{|}}{\underset{\underset{H}{|}}{C}}-\text{Hal}$$

where Hal is halogen of an atomic weight of at least 35 and can be the same or different and R is an aliphatic or aromatic, cyclic or acyclic, straight or branched chain, saturated or unsaturated bivalent radical substituted or not by groups that do not interfere with the polymer-forming reaction, such as ether, hydroxyl, keto, nitro, thiol, sulphide, carboxyl, ester, and the like. Specific examples of these dihalides include the following: methylene dibromide, 1,3-dichloropropane, isobutylene dibromide, trimethylene dibromide, 1,4-dibromopentane, p-xylylene dibromide, 1,4-cyclohexylene dichloride, methylene diiodide, 1-bromo-10-chloro-decane, octamethylene diiodide, 2,6-dibromoheptane, tetramethylene dichloride, 2,3-dibromobutane, dodecamethylene dibromide, triglycol dichloride, beta-beta'-dibromodiethyl ether, gamma,gamma'-dichlorodipropyl ether, beta,beta'-dichlorodiethyl sulphide, 1,3-dichloro-2-phenylpropane, diethyl-2,5-dibromoadipate, p,p'-di(bromomethyl)diphenyl, p,p'-di(bromomethyl)diphenyl oxide, 1,3-dichloro-2-hydroxypropane. When the pest control compositions of this invention are prepared by the reaction of a ditertiary diamine with dihalide, the latter materials should be so chosen that the sum of their radical lengths exceeds 7, as otherwise ring instead of polymer formation will take place, and the invention does not apply to such ring compounds.

Certain linear polymeric quaternary ammonium salts may also be prepared by the polymerization of omega bromo tertiary amines, e. g., omega bromohexyldimethylamine $$Br(CH_2)_6-N(CH_3)_2$$

to form polymers having the recurring unit $$-CH_2-CH_2-CH_2-CH_2-CH_2-CH_2-\underset{\underset{Br}{|}}{N}\overset{CH_3}{\underset{CH_3}{<}}$$

It is to be noted that this method cannot furnish polymeric salts wherein the radicals joining the quaternary ammonium nitrogens are alternately different. These ammonium salts also can be used in the pest control compositions of this invention.

Ingredients of the pest control compositions which are included in this invention can also be prepared by reacting a compound containing two and only two CHOH or CHSH groups (or one of each) with formaldehyde, an anhydrous acid (which is also understood to include an acid anhydride) and a ditertiary diamine. Any of the ditertiary diamines previously described and subject to the same limitations can be used in this reaction. Suitable compounds containing CHOH and/or CHSH groups can be formulated as HX—R—XH, wherein X is oxygen or sulphur and R is a divalent radical joined to the X through an aliphatic carbon atom to which at least one hydrogen is attached. By an aliphatic carbon atom is meant a carbon atom which is not part of an aromatic (including aromatic heterocyclic) ring. The carbons bearing the hydroxyl or thiol groups, having as they do both an hydroxyl or thiol group and a hydrogen atom, cannot therefore be members of an aromatic ring. Thus, subject to the above qualifications, those compounds containing CHOH and CHSH groups can be aliphatic or aromatic, cyclic or acyclic, homocyclic or heterocyclic, saturated or unsaturated, substituted or not by groups, for example ether, sulphide, ester, nitro, ketone, tertiary amide, nitrile, etc., which do not interfere with the reaction. Specific suitable compounds include the following: ethylene glycol, hexamethylene glycol, decamethylene glycol, octadecamethylene glycol, diethylene glycol, 1,4-cyclohexylene glycol, p-xylylene glycol, camphene glycol, 2,4-dihydroxyhexane, 1,5-dimercapto-3-oxopentane, 1,5-dimercaptothiapentane, 1,6-dihydroxy-2,5-dimethylhexane, 2-mercaptoethanol, and the like.

In the above reaction any nonoxidizing inorganic anhydrous acid can be used, for example, sulphur dioxide, hydrogen chloride, hydrogen bromide, hydrogen sulphide, hydrogen iodide, and the like.

Linear polymeric quaternary ammonium salts prepared by the above methods can be utilized in preparing still other pesticidally useful polymeric onium salts having a variety of anions on the pentavalent nitrogen. For example, a polymeric linear quaternary ammonium halide can be reacted with silver oxide or an alkali hydroxide, such as potassium hydroxide, to form the quaternary ammonium hydroxide which can subsequently be reacted with an acid, organic or inorganic, to form the corresponding linear polymeric quaternary ammonium salt.

Linear polymeric quaternary phosphonium salts, the use of which in pesticidal compositions is within the scope of this invention, can be prepared by the reaction of ditertiary diphosphines and alkylene dihalides, these latter compounds being of the type used in the preparation of some of the linear polymeric quaternary ammonium salts previously described. As in the case of the preparation of these latter compounds, the reactants must be so selected that the sum of their radical lengths is at least seven in order to avoid ring formation. By radical length of the ditertiary diphosphine compounds is meant the length of the chain between and inclusive of the phosphorus atoms. The radical length of the dihalides is the same as previously defined for these compounds.

Linear polymeric ternary sulphonium salts also of use in pesticidal compositions can be prepared by the reaction of alkyl halides or sulphates with polyalkylene sulphides, which in turn can be obtained from sodium sulphide and alkylene dihalides, the components being chosen so as to avoid ring formation.

The pest control compositions herein described are used chiefly in aqueous solutions, although they can also be used in organic solvent solutions or as dusts if so desired. They can be used as general purpose disinfectants such as household disinfectants and a germicide in soap, cosmetics, antiseptics, mouthwashes, kennel sprays, etc. They can also be used for sterilizing surgical instruments and for rendering animate and inanimate surfaces e. g., of leather, glue, wall board, lumber, paper, cellulosic products, etc., germ-free due to their bactericidal action. These compounds can be used with great effectiveness against the organisms which affect the mucous membranes of animals or human beings such as the cocci, and they also have such diverse uses as the sterilization of sutures, bandages, milk containers, glassware, cans, bottles, and the like.

An entirely new class of bactericidal, fungicidal, and insecticidal agents for controlling microorganisms and economically harmful insect pests has been discovered in the linear polymeric onium salts. Due to the ease of preparation of the majority of these compounds and their very remarkable effectiveness, they offer distinct advantages in the field of pest control compositions.

The products of this invention are highly bactericidal and bacteriostatic against many organisms in vitro. They exceed almost all known non-mercurials in bacterial spore-killing power and are effective against pathogenic molds (e. g., "athlete's foot") in vitro. The products all are stable, and in general are colorless and odorless. Favorable results have been shown in toxicity tests. They are very effective mothproofing agents, equalling sodium aluminum fluosilicate in tests.

The above description and examples are intended to be illustrative only. Any modification of or variation therefrom which conforms to the spirit of the invention is intended to be included within the scope of the claims.

What is claimed is:

1. A pest control composition useful for controlling economically harmful lower forms of life including bacteria, fungi, and insects, containing as an active ingredient a linear polymeric onium salt in which the multiply recurring linear polymeric unit comprises at least seven chain atoms, two of which are onium atoms of the class consisting of sulfur, nitrogen and phosphorus, separated by organic radicals attached to the onium atoms through carbon, one of the valences on each onium atom being satisfied by a radical being the anion of an acid and the remaining valences of the onium atom being satisfied by organic radicals attached to the onium atom through the carbon, not more than one of the carbons attached to the onium atom being in turn joined to another carbon by a multiple bond.

2. A pest control composition useful for controlling economically harmful lower forms of life including bacteria, fungi, and insects, containing as an active ingredient a linear polymeric quaternary ammonium compound in which the multiply recurring linear polymeric unit comprises at least seven chain atoms, two of which are quaternary ammonium atoms, separated by organic radicals attached to the quaternary ammonium atoms through carbon, one of the valences on each quaternary ammonium atom being satisfied by a radical being the anion of an acid, and the remaining valences of the quaternary ammonium atom being satisfied by organic radicals attached to the quaternary ammonium atom through carbon, not more than one of the carbons attached to the quaternary ammonium atom being in turn joined to another carbon by a multiple bond.

3. A pest control composition useful for controlling economically harmful lower forms of life including bacteria, fungi, and insects, containing as an active ingredient a linear polymeric quaternary ammonium compound in which the multiply recurring linear polymeric unit comprises at least seven chain atoms, two of which are quaternary ammonium atoms, separated by hydrocarbon radicals, one of the valences on each quaternary ammonium atom being satisfied by a radical being the anion of an acid and the remaining valences of the quaternary ammonium atom being satisfied by hydrocarbon radicals, not more than one of the carbons attached to the quaternary ammonium atom being in turn joined to another carbon by a multiple bond.

4. A pest control composition useful for controlling economically harmful lower forms of life including bacteria, fungi, and insects, containing as an active ingredient a linear polymeric quaternary ammonium compound in which the multiply recurring linear polymeric unit comprises at least seven chain atoms, two of which are quaternary ammonium atoms separated by saturated hydrocarbon radicals, one of the valences on each quaternary ammonium atom being satisfied by a radical being the anion of an acid and the remaining valences of the quaternary ammonium atom being satisfied by saturated hydrocarbon radicals.

5. A pest control composition useful for controlling economically harmful lower forms of life including bacteria, fungi, and insects, containing as an active ingredient a linear polymeric quaternary ammonium compound in which the multiply recurring linear polymeric unit comprises at least seven chain atoms, two of which are quaternary ammonium atoms, separated by aliphatic hydrocarbon radicals, one of the valences on each quaternary ammonium atom being satisfied by a radical being the anion of an acid and the remaining valences of the quaternary ammonium atom being satisfied by aliphatic hydrocarbon radicals, not more than one of the carbons attached to the quaternary ammonium atom being in turn joined to another carbon by a multiple bond.

6. A pest control composition useful for controlling economically harmful lower forms of life including bacteria, fungi, and insects, containing as an active ingredient a linear polymeric quaternary ammonium compound in which the multiply recurring linear polymeric unit comprises at least seven chain atoms, two of which are quaternary ammonium atoms, separated by saturated aliphatic hydrocarbon radicals, one of the valences on each quaternary ammonium atom being satisfied by a radical being the anion of an acid and the remaining valances of the quaternary ammonium atom being satisfied by saturated aliphatic hydrocarbon radicals.

7. A bactericidal composition containing as an active ingredient a linear polymeric onium compound in which the multiply recurring linear polymeric unit comprises at least seven chain atoms, two of which are onium atoms of the class consisting of sulfur, nitrogen and phosphorus, separated by organic radicals attached to the onium atoms through carbon, one of the valences on each onium atom being satisfied by a radical being the anion of an acid and the remaining valences of the onium atom being satisfied by organic radicals attached to the onium atom through carbon, not more than one of the carbons attached to the onium atom being in turn joined to another carbon by a multiple bond.

8. A bactericidal composition containing as an active ingredient a linear polymeric quaternary ammonium compound in which the multiply recurring linear polymeric unit comprises at least seven chain atoms, two of which are quaternary ammonium atoms, separated by organic radicals attached to the quaternary ammonium atoms through carbon, one of the valances on each quaternary ammonium atom being satisfied by a radical being the anion of an acid and the remaining valances of the quaternary ammonium atom being satisfied by organic radicals attached to the quaternary ammonium atom through carbon, not more than one of the carbons attached to the quaternary ammonium atom being in turn joined to another carbon by a multiple bond.

9. A bactericidal composition containing as an active ingredient a linear polymeric quaternary ammonium compound in which the multiply recurring linear polymeric unit comprises at least seven chain atoms, two of which are quaternary ammonium atoms, separated by hydrocarbon radicals, one of the valences on each quaternary ammonium atom being satisfied by a radical being the anion of an acid and the remaining valences of the quaternary ammonium atom being satisfied by hydrocarbon radicals, not more than one of the carbons attached to the quaternary ammonium atom being in turn joined to another carbon by a multiple bond.

10. A bactericidal composition containing as an active ingredient a linear polymeric quaternary ammonium compound in which the multiply recurring linear polymeric unit comprises at least seven chain atoms, two of which are quaternary ammonium atoms separated by saturated hydrocarbon radicals, one of the valences on each quaternary ammonium atom being satisfied by a radical being the anion of an acid and the remaining valences of the quaternary ammonium atom being satisfied by saturated hydrocarbon radicals.

11. Process for protecting objects including animate objects from the ravages of economically harmful lower forms of life including insects, bacteria, and fungi, which comprises applying to said objects, a pest control composition useful for controlling bacteria, fungi, and insects, containing as an active ingredient a linear polymeric onium compound in which the multiply recurring linear polymeric unit comprises at least seven chain atoms, two of which are onium atoms of the class consisting of sulfur, nitrogen and phosphorus, separated by organic radicals attached to the onium atoms through carbon, one of the valences on each onium atom being satisfied by a radical being the anion of an acid and the remaining valences of the onium atom being satisfied by organic radicals attached to the onium atom through carbon, not more than one of the carbons attached to the onium atom being in turn joined to another carbon by a multiple bond.

12. Process for protecting objects including animate objects from the ravages of economically harmful lower forms of life including insects, bacteria, and fungi, which comprises applying to said objects a pest control composition useful for controlling bacteria, fungi, and insects, containing as an active ingredient a linear polymeric quaternary ammonium compound in which the multiply recurring linear polymeric unit comprises at least seven chain atoms, two of which are quaternary ammonium atoms, separated by organic radicals attached to the quaternary ammonium atoms through carbon, one of the valences on each quaternary ammonium atom being satisfied by a radical being the anion of an acid and the remaining valences of the quaternary ammonium atom being satisfied by organic radicals attached to the quaternary ammonium atom through carbon, not more than one of the carbons attached to the quaternary ammonium atom being in turn joined to another carbon by a multiple bond.

13. Process for protecting objects including animate objects from the ravages of economically harmful lower forms of life including insects, bacteria, and fungi which comprises applying to said objects a pest control composition useful for controlling bacteria, fungi, and insects, containing as an active ingredient a linear polymeric quaternary ammonium compound in which the multiply recurring linear polymeric unit comprises at least seven chain atoms, two of which are quaternary ammonium atoms, separated by hydrocarbon radicals, one of the valences on each quaternary ammonium atom being satisfied by a radical being the anion of an acid and the remaining valences of the quaternary ammonium atom being satisfied by hydrocarbon radicals, not more than one of the carbons attached to the quaternary ammonium atom being in turn joined to another carbon by a multiple bond.

14. Process for protecting objects including animate objects from the ravages of economically harmful lower forms of life including insects, bacteria, and fungi which comprises applying to said objects a pest control composition useful for controlling bacteria, fungi, and insects, containing as an active ingredient a linear polymeric quaternary ammonium compound in which the multiply recurring linear polymeric unit comprises at least seven chain atoms, two of which are quaternary ammonium atoms separated by saturated hydrocarbon radicals, one of the valences on each quaternary ammonium atom being satisfied by a radical being the anion of an acid and the remaining valences of the quaternary ammonium atom being satisfied by saturated hydrocarbon radicals.

15. Process for protecting objects including animate objects from the ravages of economically harmful lower forms of life including insects, bacteria, and fungi which comprises applying to said objects a pest control composition useful for controlling bacteria, fungi, and insects, containing as an active ingredient a linear polymeric quaternary ammonium compound in which the multiply recurring linear polymeric unit comprises at least seven chain atoms, two of which are quaternary ammonium atoms, separated by aliphatic hydrocarbon radicals, one of the valences on each quaternary ammonium salt being satisfied by a radical being the anion of an acid and the remaining valences of the quaternary ammonium atom being satisfied by aliphatic hydrocarbon radicals, not more than one of the carbons attached to the quaternary ammonium atom being in turn joined to another carbon by a multiple bond.

16. Process for protecting objects including animate objects from the ravages of economically harmful lower forms of life including insects, bacteria, and fungi, which comprises applying to said objects a pest control composition useful for controlling bacteria, fungi, and insects, containing as an active ingredient a linear polymeric quaternary ammonium compound in which the multiply recurring linear polymeric unit comprises at least seven chain atoms, two of which are quaternary ammonium atoms, separated by saturated aliphatic hydrocarbon radicals, one of the valences of each quaternary ammonium atom being satisfied by a radical being the anion of an acid and the remaining valences of the quaternary ammonium atom being satisfied by saturated aliphatic hydrocarbon radicals.

17. A bactericidal composition comprising a linear polymeric quaternary ammonium bromide wherein the intralinear ammonium atoms are each joined to two methyl groups and one bromide radical and are separated by hexamethylene radicals.

18. A bactericidal composition comprising a linear polymeric quaternary ammonium bromide wherein the intralinear ammonium atoms are each joined to two methyl groups and one bromide radical and are alternately separated by hexamethylene and p-xylylene radicals.

19. A bactericidal composition comprising a linear polymeric quaternary ammonium bromide wherein the intralinear ammonium atoms are each joined to two methyl groups and one bromide radical and are alternately separated by decamethylene and methylene-di-p-phenylene ($-C_6H_4-CH_2-C_6H_4-$) radicals.

NORMAN EDWARD SEARLE.